(12) United States Patent
Nagai (10) Patent No.: US 11,616,422 B2
(45) Date of Patent: Mar. 28, 2023

(54) MOTOR CONTROLLER

(71) Applicant: TOYOTA JIDOSHA KABUSHIKI KAISHA, Toyota (JP)

(72) Inventor: Shingo Nagai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/557,916

(22) Filed: Dec. 21, 2021

(65) Prior Publication Data

US 2022/0209631 A1 Jun. 30, 2022

(30) Foreign Application Priority Data

Dec. 24, 2020 (JP) .............................. JP2020-214720
Jul. 7, 2021 (JP) .............................. JP2021-112796

(51) Int. Cl.
*H02K 11/25* (2016.01)
*G07C 5/08* (2006.01)
*H02K 11/33* (2016.01)
*H02K 7/00* (2006.01)

(52) U.S. Cl.
CPC ........... *H02K 11/25* (2016.01); *G07C 5/0816* (2013.01); *H02K 7/006* (2013.01); *H02K 11/33* (2016.01)

(58) Field of Classification Search
CPC ................ B60L 15/20; B60L 2220/42; B60L 2240/425; B60L 2240/427; B60L 2240/662; B60L 2240/667; G07C 5/0816; H02K 11/25; H02K 11/33; H02K 7/006; H02P 29/64
See application file for complete search history.

(56) References Cited

U.S. PATENT DOCUMENTS

| 2017/0126086 A1* | 5/2017 | Nagai | ..................... H02K 1/146 |
| 2020/0036268 A1* | 1/2020 | Azusawa | ............... H02K 11/33 |
| 2020/0099267 A1* | 3/2020 | Fujieda | .................... H02K 3/12 |

FOREIGN PATENT DOCUMENTS

| JP | 2006-288170 A | | 10/2006 |
| JP | 2010124594 A | * | 6/2010 |
| JP | 2020-018067 A | | 1/2020 |

OTHER PUBLICATIONS

Ishida T, JP-2010124594-A, all pages (Year: 2010).*

* cited by examiner

*Primary Examiner* — Naishadh N Desai
(74) *Attorney, Agent, or Firm* — Hunton Andrews Kurth LLP (57) ABSTRACT

A motor controller includes an atmospheric pressure sensor, a coil temperature sensor, and a voltage sensor configured to detect a voltage applied to a motor. The motor controller calculates a partial discharge inception voltage in accordance with the atmospheric pressure and the coil temperature, limits an output of the motor in response to the coil temperature exceeding a preset coil temperature upper limit value, and reduces the coil temperature upper limit value in response to a voltage exceeding the partial discharge inception voltage.

3 Claims, 12 Drawing Sheets

MOTOR CONTROLLER

CROSS REFERENCE TO RELATED APPLICATION

This application claims priority to Japanese Patent Application No. 2020-214720 filed on Dec. 24, 2020 and Japanese Patent Application No. 2021-112796 filed on Jul. 7, 2021, which are incorporated herein by reference in their entireties including the specifications, claims, drawings, and abstracts.

TECHNICAL FIELD

The present disclosure relates to a motor controller for protecting an insulation coating of a motor coil.

BACKGROUND

Electric vehicles, for example, include a motor. When a voltage applied to a motor exceeds a predetermined voltage (partial discharge inception voltage), partial discharge occurs in an insulation coating of a motor coil, resulting in deterioration of the insulation performance of the insulation coating and shortening of the life of the motor. As the partial discharge inception voltage depends on the atmospheric pressure and the coil temperature, the partial discharge inception voltage is lower when an electric vehicle travels in highlands rather than in lowlands, for example, which makes the insulation performance prone to deterioration.

JP 2020-018067 A discloses a motor controller that reduces, with a boost converter, a voltage applied to the motor exceeding the partial discharge inception voltage, to thereby prevent deterioration of the insulation performance of an insulation coating of the motor and avoid shortening of the life of the motor.

SUMMARY

Some electric vehicles, however, may include no such boost converters. Further, a boost converter, and a booster circuit forming a boost converter are expensive and therefore raise the costs for components.

Embodiments of the disclosure are therefore directed to providing a motor controller that avoids deterioration of the insulation performance of an insulation coating without a boost converter when a voltage applied to a motor exceeds the partial discharge inception voltage.

In accordance with an aspect of the disclosure, a motor controller includes an electronic control unit (ECU), an atmospheric pressure sensor configured to detect an atmospheric pressure, a coil temperature sensor configured to detect a coil temperature of a motor, and a voltage sensor configured to detect a voltage applied to the motor. The ECU is configured to calculate a partial discharge inception voltage in accordance with the atmospheric pressure detected by the atmospheric pressure sensor and the coil temperature detected by the coil temperature sensor, limit an output of the motor in response to the coil temperature detected by the coil temperature sensor exceeding a preset coil temperature upper limit value, and reduce the coil temperature upper limit value in response to the voltage detected by the voltage sensor exceeding the partial discharge inception voltage.

In accordance with another aspect of the disclosure, a motor controller includes an electronic control unit (ECU), an atmospheric pressure sensor configured to detect an atmospheric pressure, a plurality of coil temperature sensors configured to detect respective coil temperatures of a plurality of motors, and a voltage sensor configured to detect a voltage applied to the plurality of motors. The ECU is configured to calculate a plurality of partial discharge inception voltages for the plurality of motors, respectively, in accordance with the atmospheric pressure detected by the atmospheric pressure sensor and the individual coil temperatures detected by the respective coil temperature sensors, in response to at least one of the plurality of coil temperatures detected by the plurality of coil temperature sensors exceeding a coil temperature upper limit value preset for at least one of the plurality of motors, limit an output of the at least one of the plurality of motors whose coil temperature exceeds the coil temperature upper limit value, and in response to the voltage detected by the voltage sensor exceeding at least one of the partial discharge inception voltages, reduce the coil temperature upper limit value of corresponding at least one of the plurality of motors whose partial discharge inception voltage is exceeded.

In accordance with a further aspect of the disclosure, a motor controller includes an electronic control unit (ECU), an atmospheric pressure sensor configured to detect an atmospheric pressure, a coil temperature sensor configured to detect a coil temperature of a motor, and a voltage sensor configured to detect a voltage applied to the motor. The ECU is configured to calculate a partial discharge inception voltage in accordance with the atmospheric pressure detected by the atmospheric pressure sensor and the coil temperature detected by the coil temperature sensor and reduce an upper limit charging rate of a battery that supplies electric power to the motor in response to the voltage detected by the voltage sensor exceeding the partial discharge inception voltage.

The motor controller of the present disclosure regulates a rise in the coil temperature to raise the partial discharge inception voltage, in response to the voltage applied to the motor exceeding the partial discharge inception voltage. This configuration prevents deterioration of the insulation performance of the insulation coating without a voltage boost converter, thereby avoiding shortening of the life of the motor.

The motor controller of the present disclosure disposed in a vehicle including a plurality of motors regulates a rise in the coil temperature to raise the partial discharge inception voltage only for a motor whose applied voltage exceeds the partial discharge inception voltage, thereby preventing deterioration of the insulation performance of the insulation coating to avoid shortening of the life of the motor. In other words, the motor controller prevents limiting of the outputs of motors other than the motor whose applied voltage exceeds the partial discharge inception voltage, thereby avoiding unnecessary output drop of the vehicle.

The motor controller of the present disclosure lowers the upper limit charging rate of the battery to reduce the voltage to be applied to the motor to a predetermined voltage or a lower voltage, in response to the voltage applied to the motor exceeding the partial discharge inception voltage. This configuration prevents deterioration of the insulation performance of the insulation coating without a voltage boost converter and avoids shortening of the life of the motor.

BRIEF DESCRIPTION OF DRAWINGS

Embodiments of the present disclosure will be described by reference to the following figures, wherein.

DESCRIPTION OF EMBODIMENTS

Figure 1:
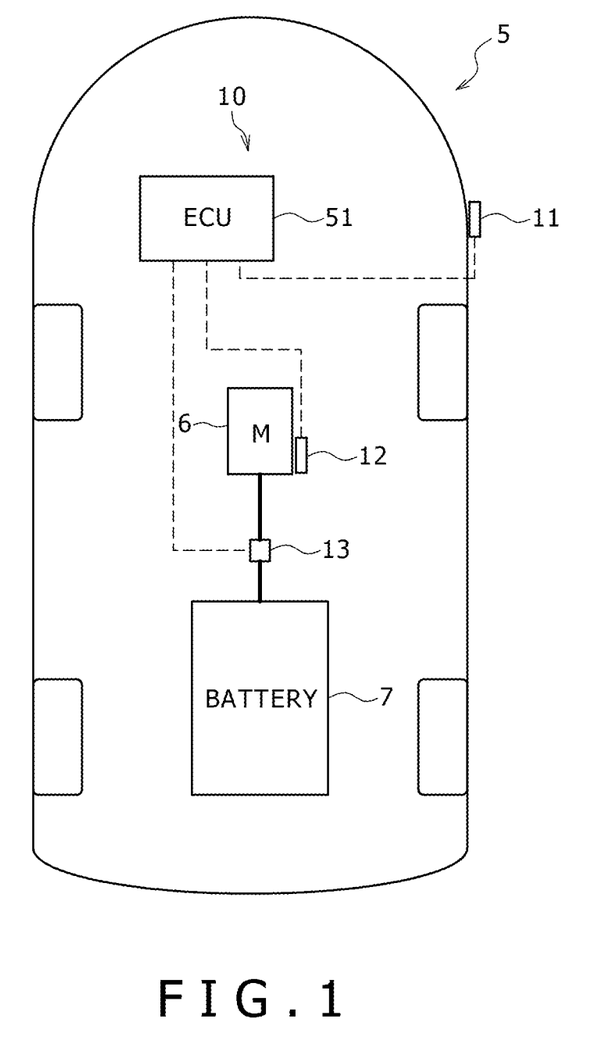
FIG. 1 schematically illustrates a vehicle including a motor controller according an embodiment.

Embodiments of the disclosure will be described in detail below. In the following description, specific shapes, materials, directions, and numeral values, for example, are only examples to facilitate understanding of the disclosure, and may be modified as appropriate in accordance with use, object, and specifications, for example. Referring to FIG. 1, a vehicle 5 including a motor controller 10 according to an embodiment will be described.

As illustrated in FIG. 1, the motor controller 10 is disposed in the vehicle 5, and includes an Electronic Control Unit (ECU) 51 as a processor that performs various types of data processing. The vehicle 5 in this example is an electric vehicle that travels with power of a motor 6 driven with electric power supplied from a battery 7. The vehicle 5 may be a hybrid electric vehicle.

The motor controller 10 performs protection control for an insulation coating of a coil of the motor 6, as will be described below. When a voltage applied to the motor 6 exceeds the partial discharge inception voltage, the motor controller 10 regulates a rise in the coil temperature to raise the partial discharge inception voltage, thereby preventing deterioration of the insulation performance of the insulation coating and avoiding shortening of the life of the motor 6. This configuration avoids deterioration of the insulation performance of the insulation coating to prevent shortening of the life of the motor 6 without including a boost converter.

The motor controller 10 includes an atmospheric pressure sensor 11 for detecting the atmospheric pressure, a coil temperature sensor 12 for detecting the coil temperature of the motor 6, and a voltage sensor 13 for detecting a voltage applied to the motor 6 (hereafter referred to as an applied voltage).

Referring to FIG. 2 to FIG. 5, the configuration of the motor controller 10 will be described.

Figure 2:
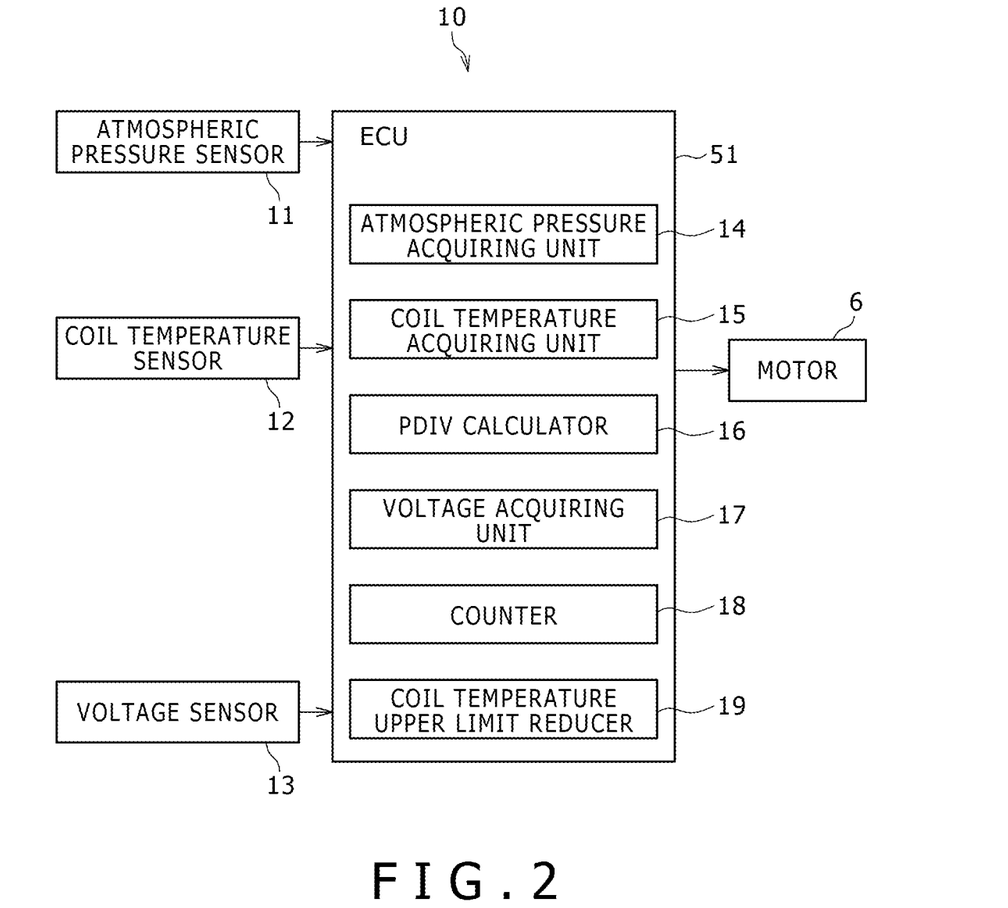
FIG. 2 is a block diagram illustrating a configuration of the motor controller.

The ECU 51 includes a Central Processing Unit (CPU) or an operation processing unit, and a memory unit such as Random Access Memory (RAM) and Read Only Memory (ROM), and performs signal processing according to a program prestored in the ROM while performing a temporary memory function of the RAM.

As illustrated in FIG. 2, the ECU 51 is connected with the atmospheric pressure sensor 11, the coil temperature sensor 12, and the voltage sensor 13, for example, to receive signals transmitted from these sensors. The ECU 51 is further connected with the motor 6 to transmit signals to the motor 6.

The ECU 51 includes an atmospheric pressure acquiring unit 14 that acquires the atmospheric pressure detected by the atmospheric pressure sensor 11, a coil temperature acquiring unit 15 that acquires the coil temperature of the motor 6 detected by the coil temperature sensor 12, a partial discharge inception voltage calculator 16 (hereinafter referred to as a PDIV calculator 16) that calculates the partial discharge inception voltage, a voltage acquiring unit 17 that acquires the applied voltage detected by the voltage sensor 13, a counter 18 that counts the number of times the voltage of the motor 6 exceeds the partial discharge inception voltage, and a coil temperature upper limit reducer 19 that lowers the upper limit value of the coil temperature.

Figure 3:
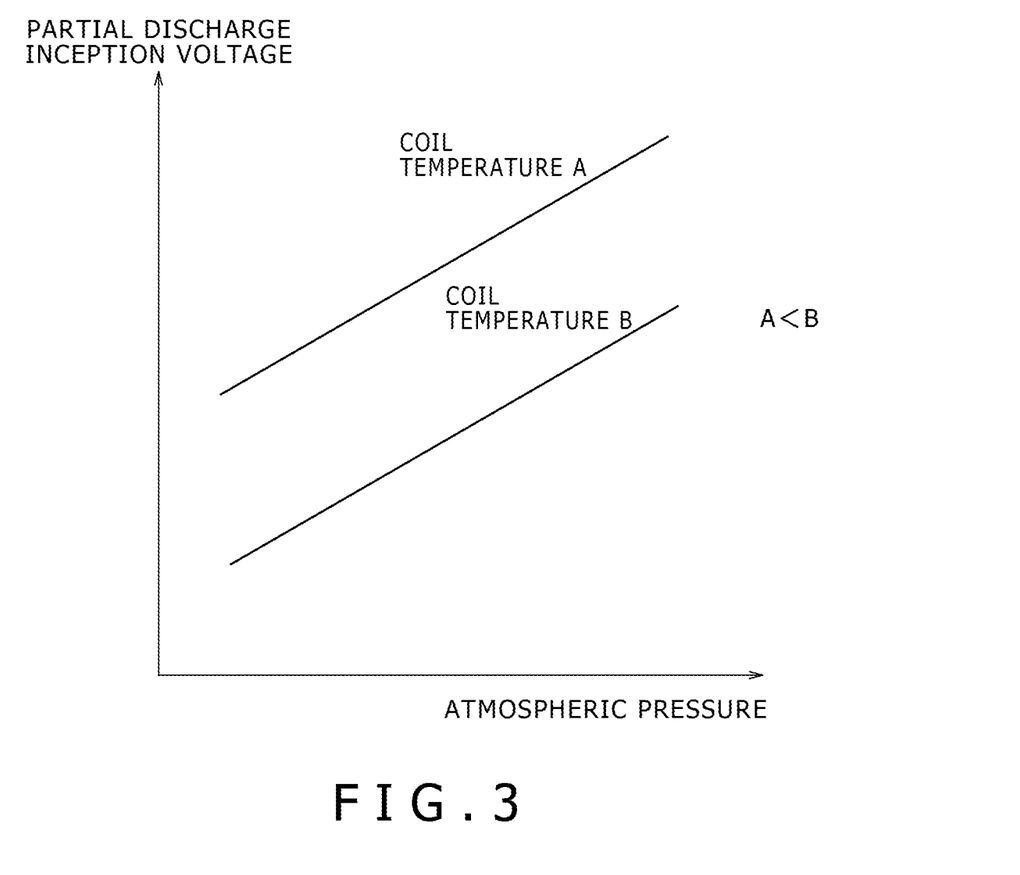
FIG. 3 is a graph illustrating a correlation between the partial discharge inception voltage of a motor and the atmospheric pressure at each coil temperature.

The PDIV calculator 16 calculates the partial discharge inception voltage in accordance with the atmospheric pressure and the coil temperature of the motor 6, as described above. When a voltage exceeding a predetermined voltage; that is, a partial discharge inception voltage, is applied to the motor 6, partial discharge occurs in the insulation coating of a coil. Partial discharge that occurs in the insulation coating of the coil deteriorates the insulation performance of the insulation coating and shortens the life of the motor 6. As illustrated in FIG. 3, the partial discharge inception voltage varies in accordance with the atmospheric pressure and the coil temperature of the motor 6.

The counter 18 counts the number of times the applied voltage exceeds the partial discharge inception voltage, as described above. The counter 18 may calculate a total time period in which the applied voltage exceeds the partial discharge inception voltage.

The coil temperature upper limit reducer 19 lowers the upper limit value of the coil temperature when the number of times the applied voltage exceeds the partial discharge inception voltage is a predetermined number or greater. The coil temperature upper limit value has been preset as an allowable upper limit coil temperature because a rise in the coil temperature breaks the coil coating and causes short circuit and heat generation of the motor 6.

Figure 4:
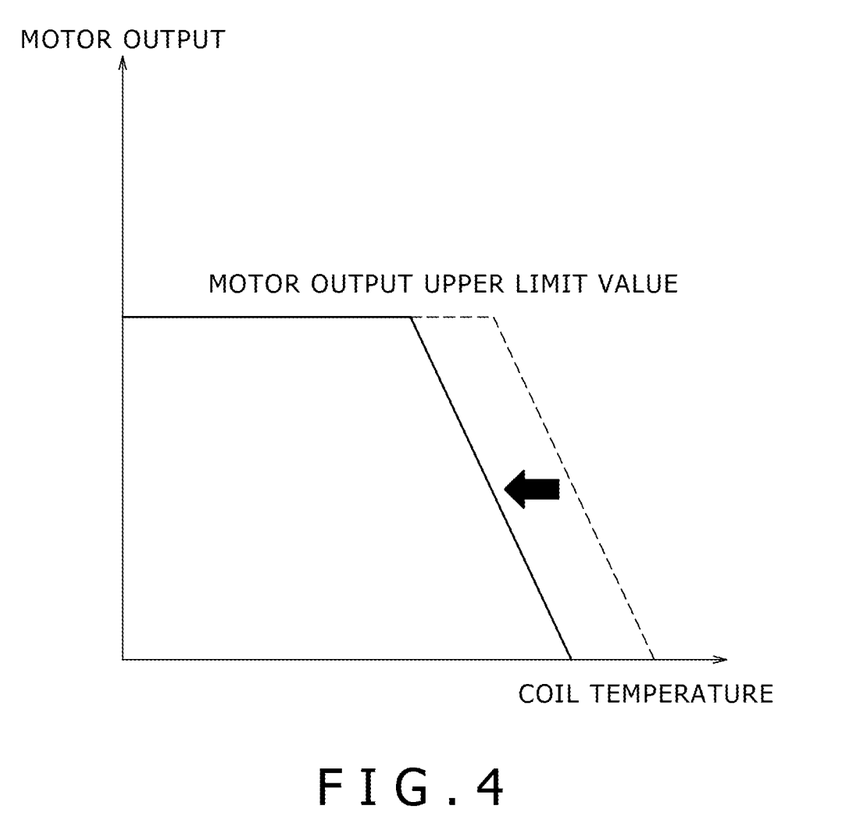
FIG. 4 is a graph illustrating a correlation between the coil temperature and the output of a motor.

FIG. 4 illustrates a correlation between the coil temperature and the output of the motor 6. As illustrated in FIG. 4, the upper limit of the output of the motor 6 is fixed at the coil temperatures below a predetermined temperature, whereas the upper limit of the output of the motor 6 is lowered at the coil temperatures being the predetermined temperature or higher. As such, the coil temperature upper limit reducer 19 lowers the predetermined temperature at which the output upper limit of the motor 6 starts to decrease.

When the output of the motor 6 exceeds the output upper limit value, the output may be restricted by, for example, limiting the torque of the motor 6 or limiting the electric current of the power to be supplied to the motor 6.

Figure 5:
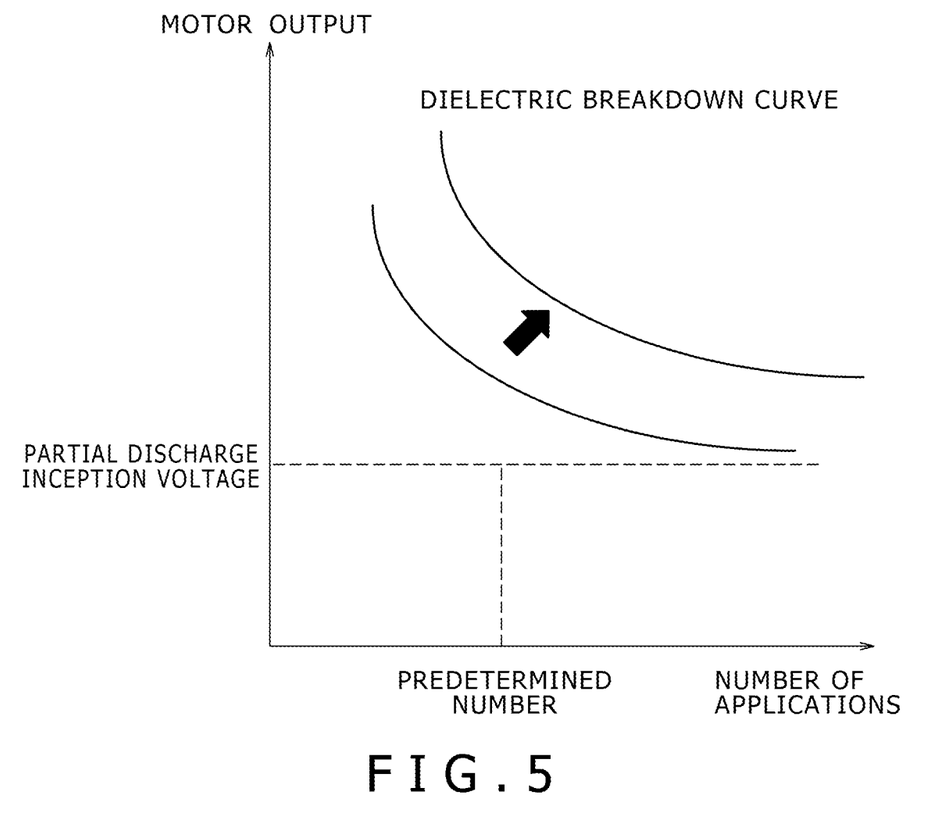
FIG. 5 is a graph illustrating dielectric breakdown curves of a motor coil and a correlation between the applied voltage and the number of applications of the voltage for each property.

FIG. 5 illustrates a relationship between the applied voltage and the number of voltage applications with respect to dielectric breakdown curves of the coil of the motor 6.

The dielectric breakdown curve represents a relationship between the applied voltage limit where the insulation coating of the coil of the motor 6 breaks and the number of voltage applications. The coil temperature upper limit value that is lowered by the coil temperature upper limit reducer 19 raises the partial discharge inception voltage to relieve the dielectric breakdown curve (that is, to raise the curve in FIG. 5).

The coil temperature upper limit reducer 19 lowers the coil temperature at which the output upper limit value is decreased and regulates a rise in the coil temperature to raise the partial discharge inception voltage. This configuration prevents deterioration of the insulation performance of the insulation coating and avoids shortening of the life of the motor 6 when the applied voltage exceeds the partial discharge inception voltage before being raised. This configuration further eliminates the use of a voltage boost converter for preventing deterioration of the insulation performance of the insulation coating and avoiding shortening of the life of the motor 6.

Figure 6:
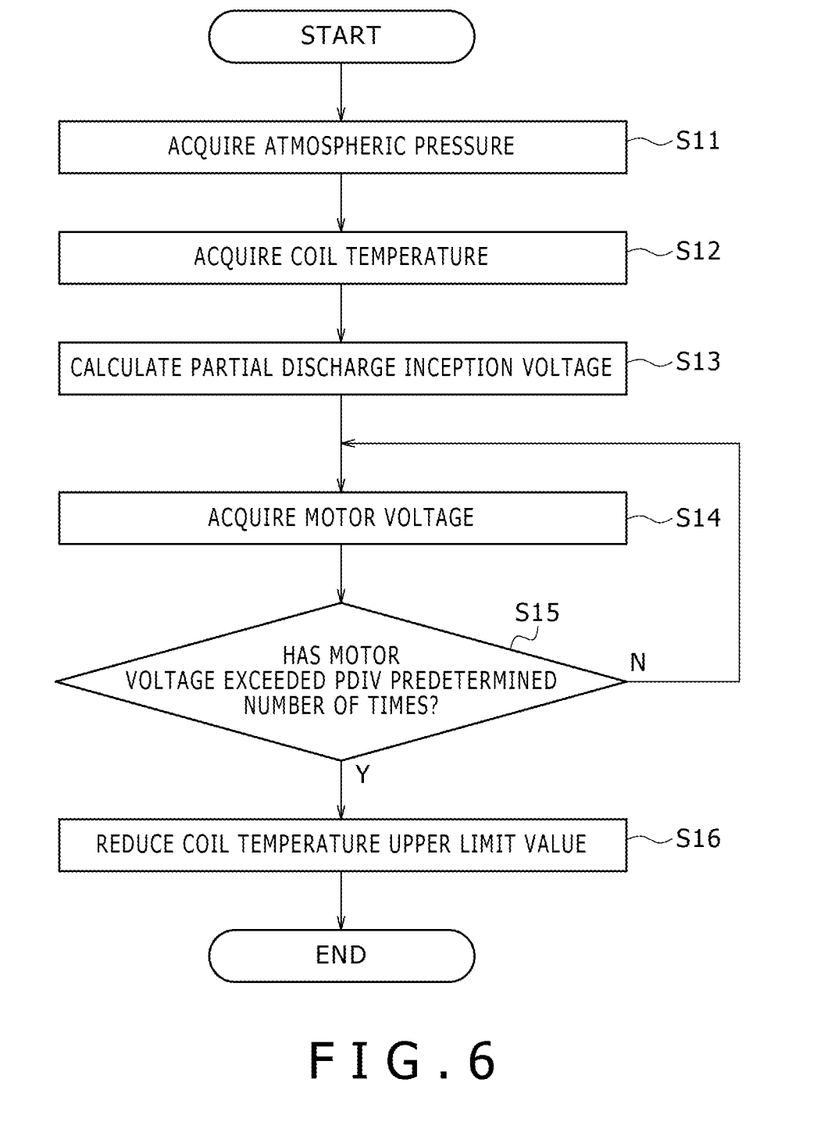
FIG. 6 is a flow chart illustrating a protection control flow for an insulation coating.

Referring now to FIG. 6, a flow of protection control of the insulation coating by the motor controller 10 will be described.

As illustrated in FIG. 6, in step S11, the atmospheric pressure acquiring unit 14 acquires the atmospheric pressure detected by the atmospheric pressure sensor 11. In step S12, the coil temperature acquiring unit 15 acquires the coil temperature of the motor 6 detected by the coil temperature sensor 12.

In step S13, the PDIV calculator 16 calculates the partial discharge inception voltage based on the atmospheric pressure acquired in step S11 and the coil temperature acquired in step S12. Correlations among the atmospheric pressure, the coil temperature, and the partial discharge inception voltage are prestored in the motor controller 10.

In step S14, the voltage acquiring unit 17 acquires the voltage applied to the motor 6 that is detected by the voltage sensor 13. In step S15, whether or not the voltage acquired in step S14 has exceeded the partial discharge inception voltage a predetermined number of times is determined. In response to YES determined in step S15, the process proceeds to step S16. In response to No determined in step S15, the process returns to step S14.

In step S16, the coil temperature upper limit reducer 19 reduces the upper limit value of the coil temperature. In other words, the coil temperature upper limit reducer 19 lowers the coil temperature at which the upper limit of the output of the motor 6 starts to decrease.

Figure 7:
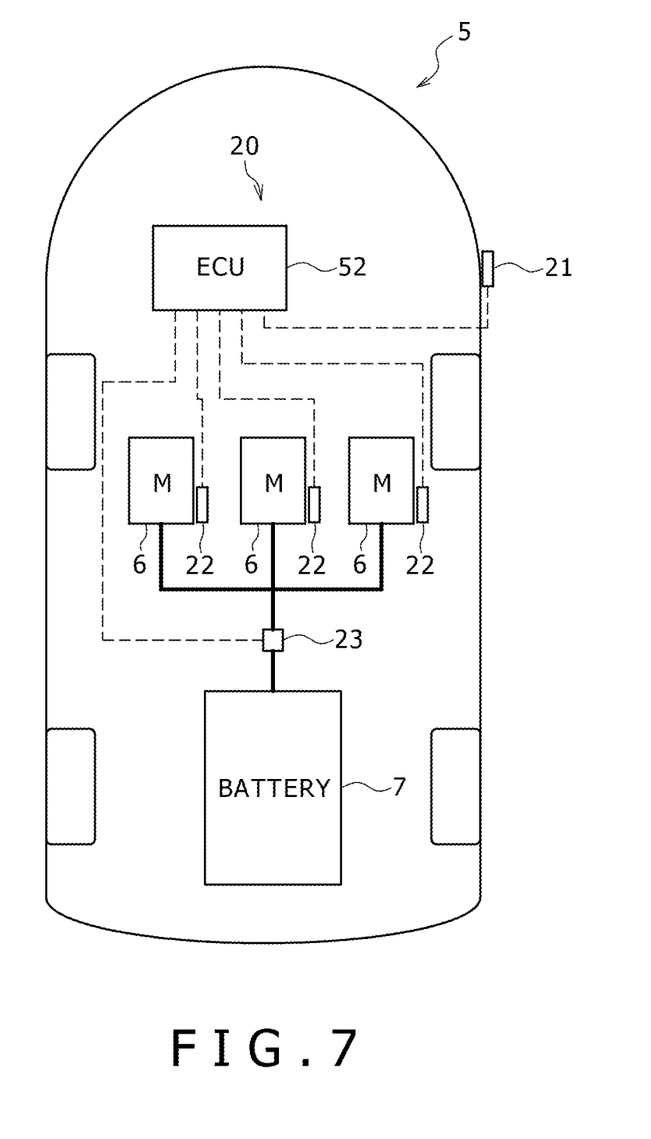
FIG. 7 schematically illustrates a vehicle including a motor controller according to a further embodiment.

Referring to FIG. 7, a motor controller 20 according to a further example embodiment will be described.

As illustrated in FIG. 7, a motor controller 20 is disposed in a vehicle 5. The vehicle 5 includes an Electronic Control Unit (ECU) 52 as a processor that performs various types of data processing. The vehicle 5 in this example is an electric vehicle that travels with powers from a plurality of (three, in this example) motors 6 driven with electric power supplied from a battery 7. The vehicle 5 may be a hybrid electric vehicle, for example.

The motor controller 20 controls the motors 6 disposed in the vehicle 5. As will be described in detail below, the motor controller 20 regulates a rise in the coil temperature of only the motor 6 whose applied voltage exceeds the partial discharge inception voltage to raise the partial discharge inception voltage, thereby avoiding deterioration of the insulation performance of the insulation coating and shortening of the life of the motor 6.

In other words, the motor controller 20 need not limit the outputs of the motors 6 other than the motor 6 whose applied voltage exceeds the partial discharge inception voltage and avoids an unnecessary output drop of the vehicle 5.

The motor controller 20 includes an atmospheric pressure sensor 21 for detecting the atmospheric pressure, a plurality of coil temperature sensors 22 for detecting corresponding coil temperatures of the plurality of motors 6, respectively, and a voltage sensor 23 for detecting the applied voltages.

Figure 8:
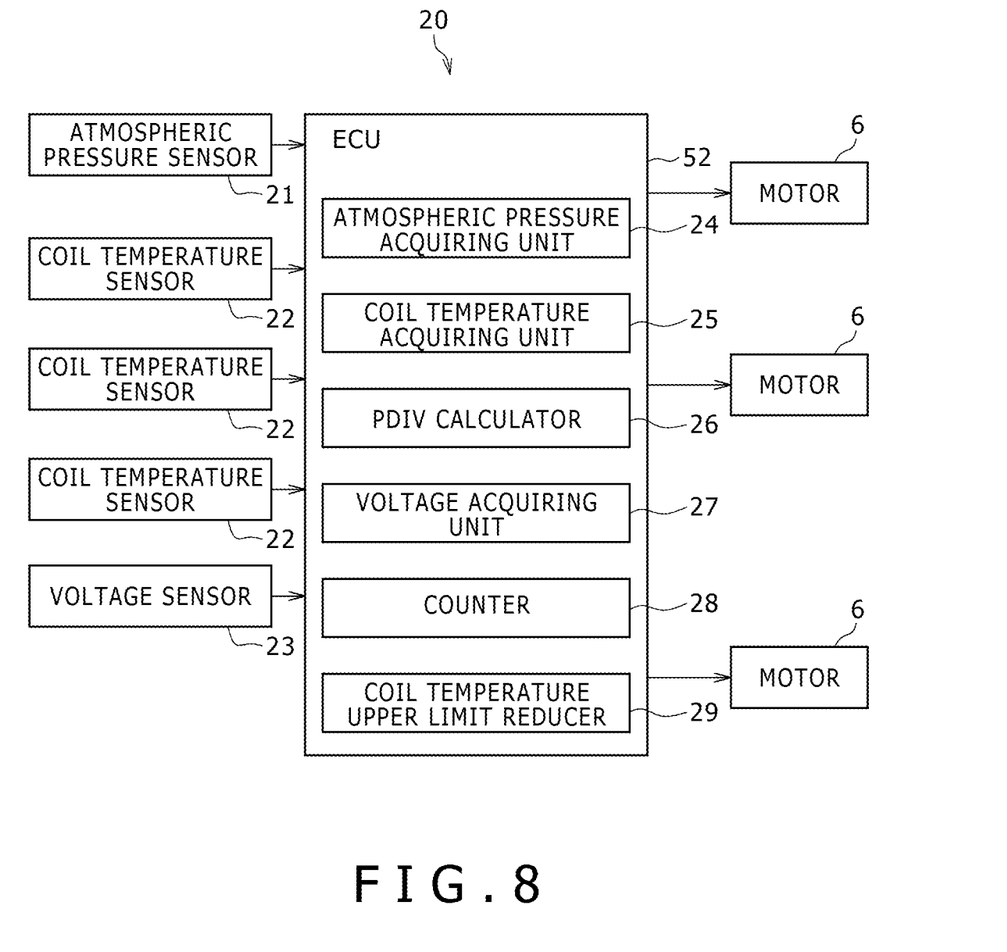
FIG. 8 is a block diagram illustrating a configuration of the motor controller.

Referring to FIG. 8, the configuration of the motor controller 20 will be described.

The ECU 52 includes a Central Processing Unit (CPU) or an operation processing unit, and a memory unit such as Random Access Memory (RAM) and Read Only Memory (ROM), and performs signal processing according to a program prestored in the ROM while performing a temporary memory function of the RAM.

The ECU 52 includes an atmospheric pressure acquiring unit 24 for acquiring the atmospheric pressure detected by the atmospheric pressure sensor 21, a coil temperature acquiring unit 25 for acquiring the coil temperatures of the corresponding motors 6 acquired by the coil temperature sensors 22, a partial discharge inception voltage calculator 26 (hereinafter referred to as a PDIV calculator 26) for calculating the partial discharge inception voltages, a voltage acquiring unit 27 for acquiring the applied voltages of the motors 6 detected by the voltage sensor 23, a counter 28 for counting the number of times the applied voltage exceeds the partial discharge inception voltage, and a coil temperature upper limit reducer 29 for reducing the coil temperature upper limit value.

The PDIV calculator 26 calculates a plurality of partial discharge inception voltages for the plurality of motors 6, respectively, in accordance with the atmospheric pressure acquired by the atmospheric pressure acquiring unit 24 and the plurality of coil temperatures acquired by the coil temperature acquiring unit 25.

The counter 28 counts the number of times the voltage detected by the voltage acquiring unit 27 exceeds the respective partial discharge inception voltages, and the temperature upper limit reducer 29 lowers the coil temperature upper limit value of the motor 6 for which the number of times exceeds a predetermined number.

The remaining functions of the motor controller 20 are the same as those of the motor controller 10 described above and will not be described.

Figure 9:
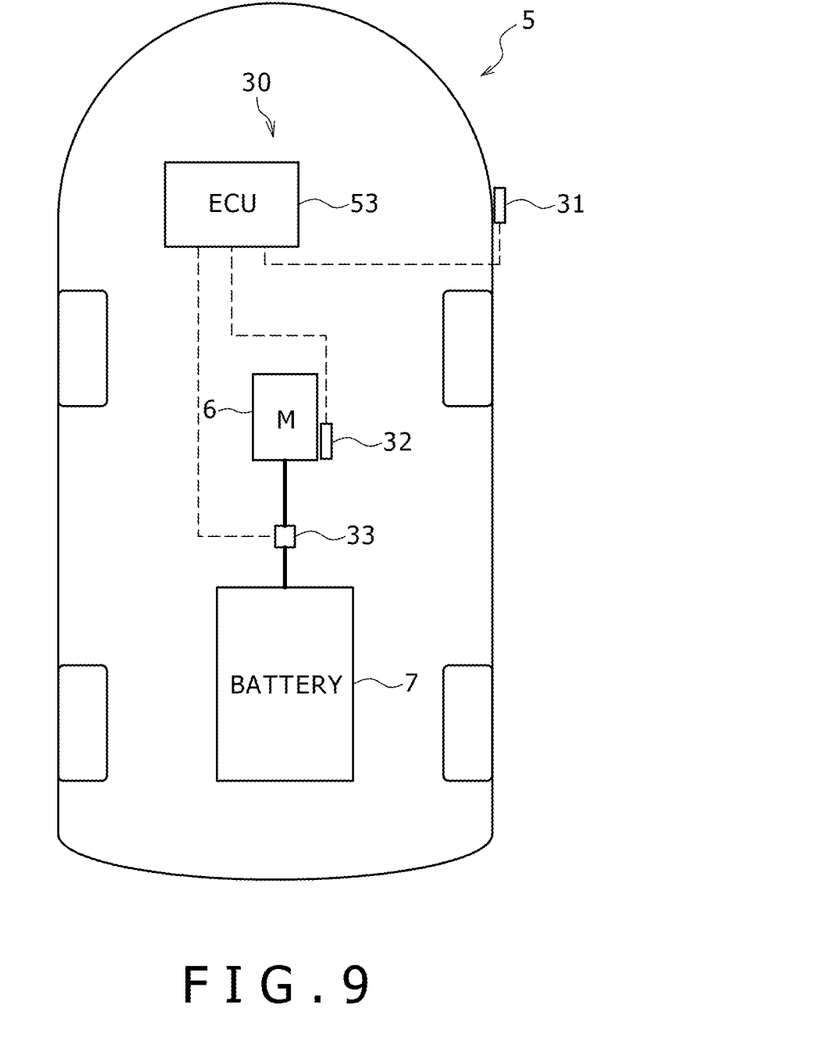
FIG. 9 schematically illustrates a vehicle including a motor controller according to a further embodiment.

Referring to FIG. 9, a vehicle 5 including a motor controller 30 according to a further example embodiment will be described.

As illustrated in FIG. 9, the motor controller 30 is disposed in a vehicle 5 and includes an Electronic Control Unit (ECU) 53 as a processor that performs various types of data processing. The vehicle 5 in this example is an electric vehicle that travels with power of a motor 6 driven with electric power supplied from a battery 7. The vehicle 5 may be a hybrid electric vehicle, for example.

The motor controller 30 performs protection control for an insulation coating of a coil of the motor 6, as will be described below. When the voltage applied to the motor 6 exceeds the partial discharge inception voltage, the motor controller 30 lowers the upper limit charging rate of the battery 7 to reduce the voltage to be applied to the motor 6 to a predetermined voltage or a lower voltage, thereby preventing deterioration of the insulation performance of the insulation coating and avoiding shortening of the life of the motor 6. This configuration avoids deterioration of the insulation performance of the insulation coating to prevent shortening of the life of the motor 6 without a boost converter.

The motor controller 30 includes an atmospheric pressure sensor 31 for detecting the atmospheric pressure, a coil temperature sensor 32 for detecting the coil temperature of the motor 6, and a voltage sensor 33 for detecting a voltage applied to the motor 6 (hereafter referred to as an applied voltage).

Figure 10:
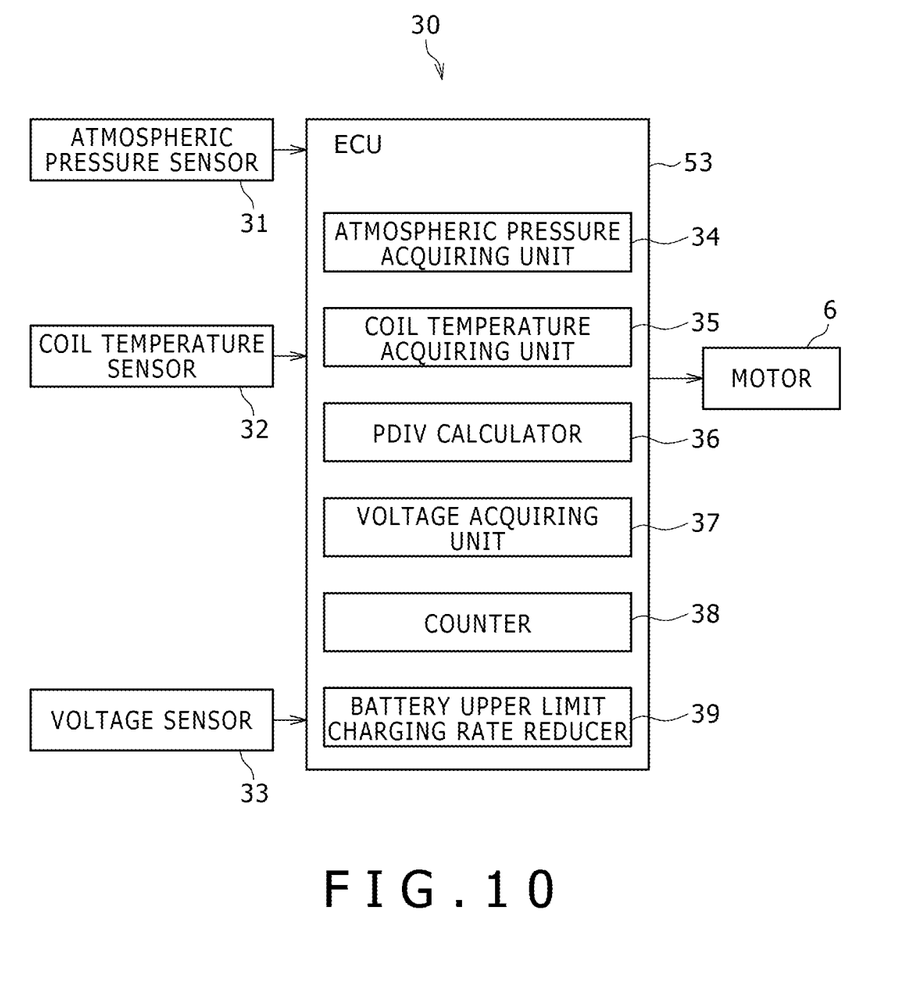
FIG. 10 is a block diagram illustrating a configuration of the motor controller.

Referring to FIG. 10, the configuration of the motor controller 30 will be described.

The ECU 53 includes a Central Processing Unit (CPU) or an operation processing unit, and a memory unit such as Random Access Memory (RAM) and Read Only Memory (ROM), and performs signal processing according to a program prestored in the ROM while performing a temporary memory function of the RAM.

As illustrated in FIG. 10, the ECU 53 is connected with the atmospheric pressure sensor 31, the coil temperature sensor 32, and the voltage sensor 33, for example, to receive signals transmitted from these components. The ECU 53 is further connected with the motor 6 to transmit signals to the motor 6.

The ECU 53 includes an atmospheric pressure acquiring unit 34 that acquires the atmospheric pressure detected by the atmospheric pressure sensor 31, a coil temperature acquiring unit 35 that acquires the coil temperature of the motor 6 detected by the coil temperature sensor 32, a partial discharge inception voltage calculator 36 (hereinafter referred to as a PDIV calculator 36) that calculates the partial discharge inception voltage, a voltage acquiring unit 37 that acquires the applied voltage detected by the voltage sensor 33, a counter 38 that counts the number of times the voltage of the motor 6 exceeds the partial discharge inception voltage, and a battery upper limit charging rate reducer 39 that lowers the upper limit charging rate of the battery 7.

The PDIV calculator 36 calculates the partial discharge inception voltage in accordance with the atmospheric pressure and the coil temperature of the motor 6, as described above.

The counter 38 counts the number of times the applied voltage exceeds the partial discharge inception voltage, as described above. The counter 38 may calculate a total time period in which the applied voltage exceeds the partial discharge inception voltage.

The battery upper limit charging rate reducer 39 lowers the upper limit charging rate of the battery 7 when the number of times the applied voltage exceeds the partial discharge inception voltage is a predetermined number or greater. The upper limit charging rate of the battery 7 refers to an upper limit rate of the remaining amount of electricity of the battery 7 excluding an amount of discharged electricity from the amount of electricity of the battery 7 in a fully charged state.

Specifically, the upper limit charging rate of the battery 7 which is lowered by the battery upper limit charging rate reducer 39 limits charging of the battery 7 with a regenerated energy to a predetermined rate or lower while the vehicle 5 is travelling, for example, or limits charging of the battery 7 to a predetermined rate or lower at a charging station.

Figure 11:
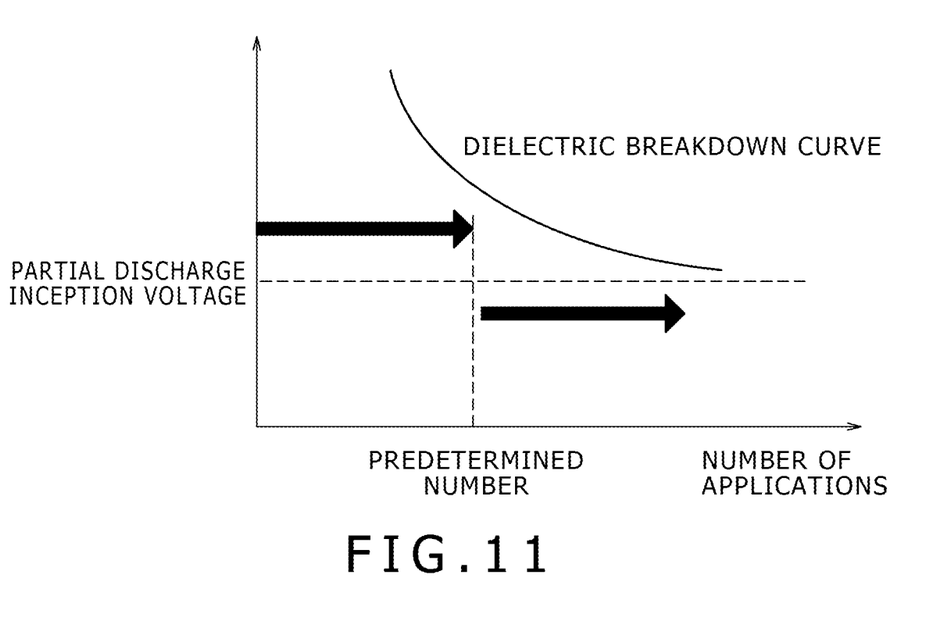
FIG. 11 is a graph illustrating a dielectric breakdown curve of a motor coil and a correlation between the applied voltage and the number of applications of the voltage for each property.

FIG. 11 illustrates a relationship between the applied voltage and the number of voltage applications with respect to a dielectric breakdown curve of the coil of the motor 6. The dielectric breakdown curve represents a relationship between the applied voltage limit where the insulation coating of the coil of the motor 6 breaks and the number of voltage applications. The upper limit charging rate of the battery 7 which is lowered by the battery upper limit charging rate reducer 39 reduces the applied voltage to the motor 6 to a predetermined voltage or lower, away from the dielectric breakdown curve.

The battery upper limit charging rate reducer 39 lowers the upper limit charging rate of the battery 7 to reduce the voltage to be applied to the motor 6 to the predetermined voltage or less. This configuration prevents deterioration of the insulation performance of the insulation coating voltage without a boost converter and avoids shortening of the life of the motor 6.

Figure 12:
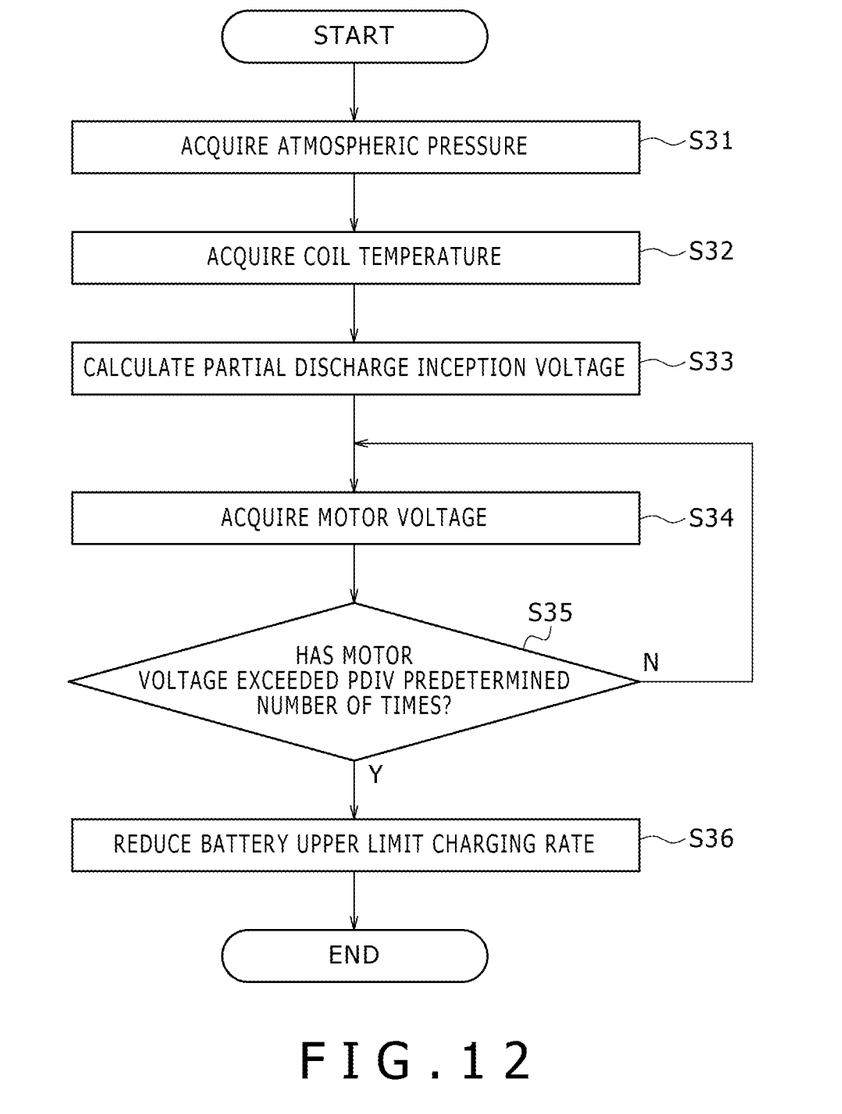
FIG. 12 is a flow chart illustrating a protection control flow for an insulation coating.

Referring now to FIG. 12, a flow of protection control of the insulation coating by the motor controller 30 will be described.

As illustrated in FIG. 12, in step S31, the atmospheric pressure acquiring unit 34 acquires the atmospheric pressure detected by the atmospheric pressure sensor 31. In step 32, the coil temperature acquiring unit 35 acquires the coil temperature of the motor 6 detected by the coil temperature sensor 32.

In step S33, the PDIV calculator 36 calculates the partial discharge inception voltage based on the atmospheric pressure acquired in step S31 and the coil temperature acquired in step S32. Correlations among the atmospheric pressure, the coil temperature, and the partial discharge inception voltage are prestored in the motor controller 30.

In step S34, the voltage acquiring unit 37 acquires the voltage applied to the motor 6 that is detected by the voltage sensor 33. In step S35, whether or not the voltage acquired in step S34 has exceeded the partial discharge inception voltage a predetermined number of times is determined. In response to YES determined in step S35, the process proceeds to step S36. Meanwhile, in response to No determined in step S35, the process returns to step S34.

In step S36, the battery upper limit charging rate reducer 39 lowers the upper limit charging rate of the battery 7. In other words, the motor controller 30 reduces the voltage to be applied to the motor 6 to a predetermined voltage or a lower voltage.

The present disclosure is not limited to the embodiments described above and their modification examples, and various modifications and improvements may be made within the scope of matters recited in the claims of the present application.

The invention claimed is:

1. A motor controller comprising:
   an electronic control unit (ECU);
   an atmospheric pressure sensor configured to detect an atmospheric pressure;
   a coil temperature sensor configured to detect a coil temperature of a motor; and
   a voltage sensor configured to detect a voltage applied to the motor, wherein
   the ECU is configured to:
      calculate a partial discharge inception voltage in accordance with the atmospheric pressure detected by the atmospheric pressure sensor and the coil temperature detected by the coil temperature sensor;
      limit an output of the motor in response to the coil temperature detected by the coil temperature sensor exceeding a preset coil temperature upper limit value; and
      reduce the coil temperature upper limit value in response to the voltage detected by the voltage sensor exceeding the partial discharge inception voltage.

2. A motor controller comprising:
   an electronic control unit (ECU);
   an atmospheric pressure sensor configured to detect an atmospheric pressure;

a plurality of coil temperature sensors configured to detect corresponding coil temperatures of a plurality of motors; and a voltage sensor configured to detect a voltage applied to the plurality of motors, wherein the ECU is configured to:

calculate a plurality of partial discharge inception voltages for the plurality of motors, respectively, in accordance with the atmospheric pressure detected by the atmospheric pressure sensor and the individual coil temperatures detected by the respective coil temperature sensors;

in response to at least one of the plurality of coil temperatures detected by the plurality of coil temperature sensors exceeding a coil temperature upper limit value preset for corresponding at least one of the plurality of motors, limit an output of the at least one of the plurality of motors whose coil temperature exceeds the coil temperature upper limit value; and in response to the voltage detected by the voltage sensor exceeding at least one of the partial discharge inception voltages, reduce the coil temperature upper limit value of corresponding at least one of the plurality of motors whose partial discharge inception voltage is exceeded.

3. A motor controller comprising:

an electronic control unit (ECU);

an atmospheric pressure sensor configured to detect an atmospheric pressure;

a coil temperature sensor configured to detect a coil temperature of a motor; and a voltage sensor configured to detect a voltage applied to the motor, wherein the ECU is configured to:

calculate a partial discharge inception voltage in accordance with the atmospheric pressure detected by the atmospheric pressure sensor and the coil temperature detected by the coil temperature sensor; and reduce an upper limit charging rate of a battery that supplies electric power to the motor in response to the voltage detected by the voltage sensor exceeding the partial discharge inception voltage.

* * * * *